(12) United States Patent
Keshtkar

(10) Patent No.: US 8,210,331 B2
(45) Date of Patent: Jul. 3, 2012

(54) ONE-WAY PAWL CLUTCH WITH BACKLASH REDUCTION MEANS AND WITHOUT BIASING MEANS

(76) Inventor: Hossein Estahbanati Keshtkar, Ann Arbor, MI (US)

( * ) Notice: Subject to any disclaimer, the term of this patent is extended or adjusted under 35 U.S.C. 154(b) by 711 days.

(21) Appl. No.: 11/713,130

(22) Filed: Mar. 2, 2007

(65) Prior Publication Data
US 2007/0205069 A1    Sep. 6, 2007

Related U.S. Application Data

(60) Provisional application No. 60/779,546, filed on Mar. 6, 2006.

(51) Int. Cl.
*F16D 11/00* (2006.01)
(52) U.S. Cl. .......................... 192/46; 192/41 R
(58) Field of Classification Search .................. 192/46, 192/45.1, 41 R
See application file for complete search history.

(56) References Cited

U.S. PATENT DOCUMENTS

| | | | | |
|---|---|---|---|---|
| 70,059 A | * | 10/1867 | Wilbur ........................... | 192/46 |
| 1,396,343 A | * | 11/1921 | Richardson ..................... | 192/46 |
| 1,672,673 A | * | 6/1928 | Carling ........................... | 192/46 |
| 3,486,597 A | * | 12/1969 | Carlton ........................... | 192/46 |
| 3,667,307 A | * | 6/1972 | Kelch .............................. | 74/126 |
| 6,854,577 B2 | * | 2/2005 | Ruth ............................... | 192/46 |

\* cited by examiner

*Primary Examiner* — David D Le
*Assistant Examiner* — Ryan Dodd

(57) ABSTRACT

One-way clutches primarily employ a driving ring, a driven ring, and a number of identical connectors. The driving ring and the driven ring are rotationally detached, are coaxial, and are configured to house the connectors between them. In one rotational direction, the connectors engage the driving and the driven rings, causing them to rotate in unison. In the opposite rotational direction, the connectors disengage the driving and the driven rings, causing them to freewheel. All existing one-way clutches are aided by means that bias the connectors toward engagement, introducing noise, wear, and heat while freewheeling. Additionally, existing one-way clutches that utilize relatively more efficient pawls as connectors, undergo relatively more backlash from freewheeling to engagement, introducing operational imprecision. The one-way clutch in the present invention utilizes pawls for maximum mechanical efficiency. Furthermore, this invention does not require any biasing means, and its backlash can be reduced to any desirable degree.

16 Claims, 14 Drawing Sheets

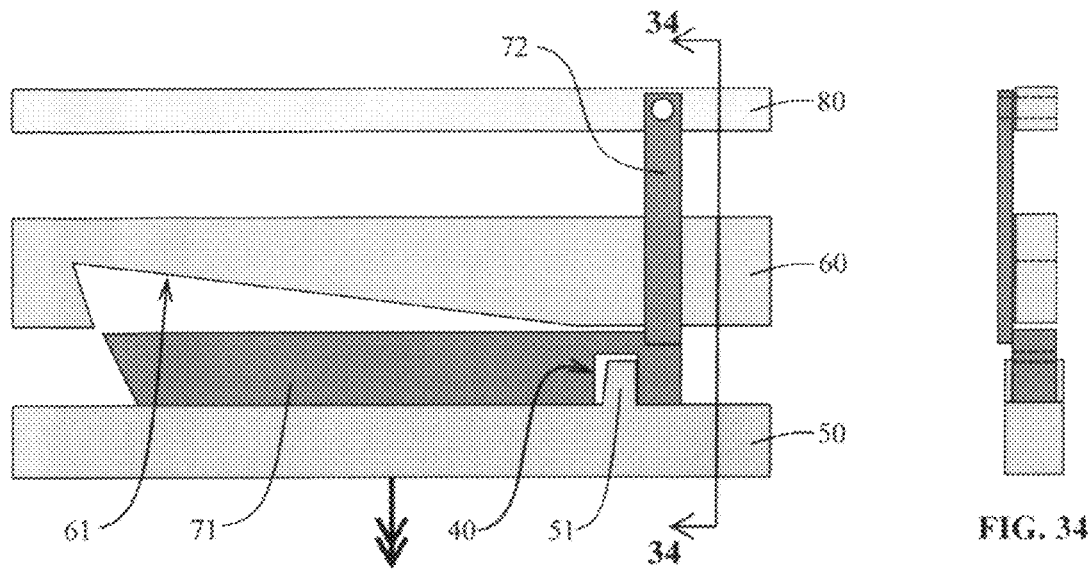
FIG. 32
FIG. 34
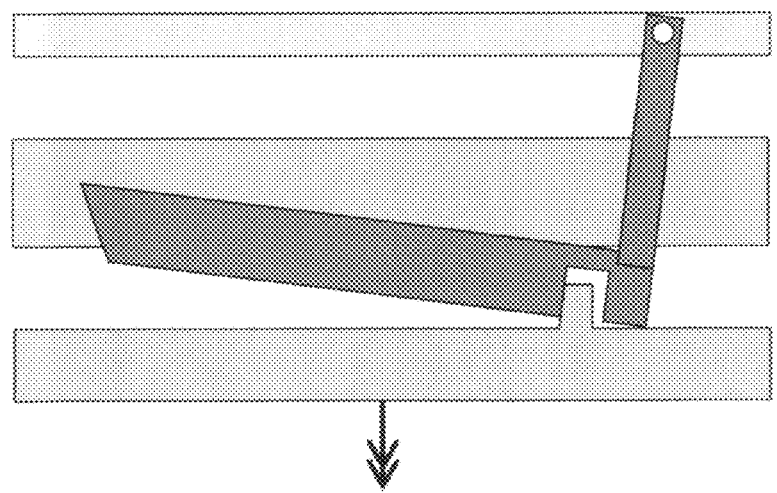
FIG. 33

ONE-WAY PAWL CLUTCH WITH BACKLASH REDUCTION MEANS AND WITHOUT BIASING MEANS

This utility application claims priority from provisional application 60/779,546 filed on Mar. 6, 2006.

BACKGROUND OF THE INVENTION

One-way clutch mechanisms employ as their primary components a driving ring, a driven ring, and a plurality of identical connectors. The driving ring and the driven ring are coaxial, are rotationally detached, and are configured in such a way as to house the connectors between them. The connectors act as one-way links between the driving ring and the driven ring. In one rotational direction, the connectors jam the driving ring and the driven ring, causing all components to rotate in unison and hence transmit torque from the driving ring to the driven ring. In the opposite rotational direction, the connectors are detached such that the driving ring cannot impart torque or rotation to the driven ring. When the connectors jam the driving ring and the driven ring, the clutch is said to be engaged. When the connectors are detached, the clutch is said to be disengaged or to freewheel. One-way clutch systems function in the two distinct modes of engagement and freewheeling.

In existing one-way clutch systems, the change from the freewheeling mode to the engaged mode is aided by means that bias the connectors toward engagement. The bias is necessary for the inception of clutch engagement, but in the freewheeling mode it introduces undesirable noise, wear, heat, and the need for special lubrication and heat removal.

The connector in existing one-way clutches is typically a roller, a sprag, or a pawl. Rollers and sprags are similar in the way they transmit torque. In the engaged mode, the rollers or sprags are wedged between corresponding converging surfaces on the driving ring and the driven ring, thereby transmitting torque by the nearly radial thrust in rollers or sprags. Consequently, large stresses and deformations develop in the mechanism, necessitating use of a large number of rollers or sprags, and requiring massive components with high material strength and hardness.

In contrast to rollers or sprags, pawls transmit torque more efficiently. In the engaged mode, the pawls are disposed between corresponding notches in the driving ring and the driven ring, thereby transferring torque by the nearly tangential thrust in the pawls. The resulting stresses and deformations are relatively low, accommodating use of fewer pawls and lighter components with low material strength and hardness.

Given the undesirable characteristics of roller or sprag clutches in terms of their torque transfer efficiency, they, however, have the desirable attribute of undergoing only negligible degree of backlash during engagement. In contrast, existing pawl clutches with their desirable torque transfer efficiency undergo a considerable degree of backlash during engagement. An additional undesirable characteristic of all existing one-way clutches is the biasing of the connectors toward engagement when the system is in freewheeling mode.

The one-way clutch mechanism that is the subject of this invention falls within the pawl-type category of one way clutch systems with the added novelties that it does not require a biasing mechanism toward engagement, and its backlash can be reduced to any desirable degree. Consequently, in addition to its torque transmission efficiency in the engaged mode, it undergoes negligible backlash in the engaging process and thus prohibits excessive noise, wear, and heat in the freewheeling mode of its operation.

BRIEF SUMMARY OF THE INVENTION

The subject of this invention is a one-way clutch mechanism whose essential features are described in this section. The mechanism comprises a driving ring, a driven ring, and a pawl ring, wherein the said three rings are coaxial, and the driven ring is disposed between the driver ring and the pawl ring.

The mechanism also comprises a generally L-shaped pawl comprising an arm, a corner, and a stem, where the free end of the pawl stem is pivoted to the pawl ring in such a way that the pawl arm is disposed between the driving ring and the driven ring.

The driven ring, on one surface facing the driving ring, comprises an engaging means, as in a notch or a ridge, for receiving the free end of the pawl arm.

The driving ring and the pawl arm are operatively coupled so as to facilitate two distinct modes of operation; namely, the freewheeling mode and the engagement mode.

In the freewheeling mode, the said coupling acts in such a way that rotation of the driving ring in a first rotational direction causes the free end of the pawl arm to move toward the driving ring until the pawl arm contacts the driving ring, at which point the driving ring, the pawl, and the pawl ring rotate in unison in the same direction without affecting the driven ring.

In the engagement mode, the said coupling acts in such a way that rotation of the driving ring in a second rotational direction causes the free end of the pawl arm to move away from the driving ring until the pawl arm contacts the driven ring. From this point, additional rotation of the driving ring in the same direction maintains the said contact until the pawl arm is fully engaged with the engaging means on the driven ring. From this point on, the entire mechanism rotates in unison in the same direction.

BRIEF DESCRIPTION OF DRAWINGS

FIG. 32 A schematic radial view of an embodiment of the present invention in the freewheeling mode, including a driving ring with a pair of keys on one surface, a driven ring with a notch on one surface, a pawl ring with a pivot hole, and an L-shaped pawl comprising an arm with a slant at one end, and a stem that overlaps the arm at one end and includes a pivot hole at the other end.

FIG. 33 The embodiment of FIG. 32 in the engaged mode.

FIG. 34 A radial cross section of the system in FIG. 32 as viewed through section 34 in FIG. 32.

DETAILED DESCRIPTION OF THE INVENTION

The present invention concerns a new one-way clutch mechanism in which a pawl is used as its connector. The kinematics of the mechanism as described in the "Brief Summary of the Invention" can be embodied in more than one mechanical form.

Figure 1:
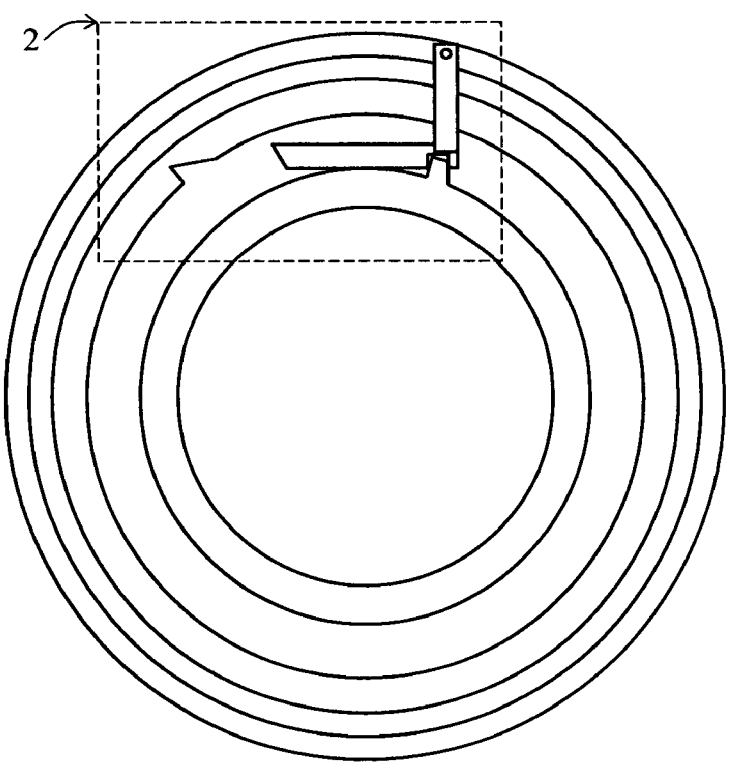
FIG. 1 A schematic axial view of an embodiment of the present invention including a driving ring with a key on its outer cylindrical surface, a driven ring with a notch on its inner cylindrical surface, a pawl ring with a pivot hole, and an L-shaped pawl comprising a stem with a pivot hole and an arm with a slant at one end and a groove near the other end.

An axial view of one embodiment is shown in FIG. 1 in which the said three rings are stacked radially, the pawl ring 80 encircles the driven ring 60, and the driven ring 60 encircles the driving ring 50; and in which the said operative coupling is achieved by interaction between a key 51 on the surface of the driving ring 50 facing the driven ring 60 and a groove 40 in the corner end of the pawl arm 71 in which the said key is disposed. In this particular case, the engaging means on the driven ring 60 is in the form of a notch 61. Furthermore, in this particular case, the corner end of the pawl stem 72 overlaps the corner end of the pawl arm 71 in order to avoid interference between the pawl stem 72 and the driven ring 60.

Figure 2:
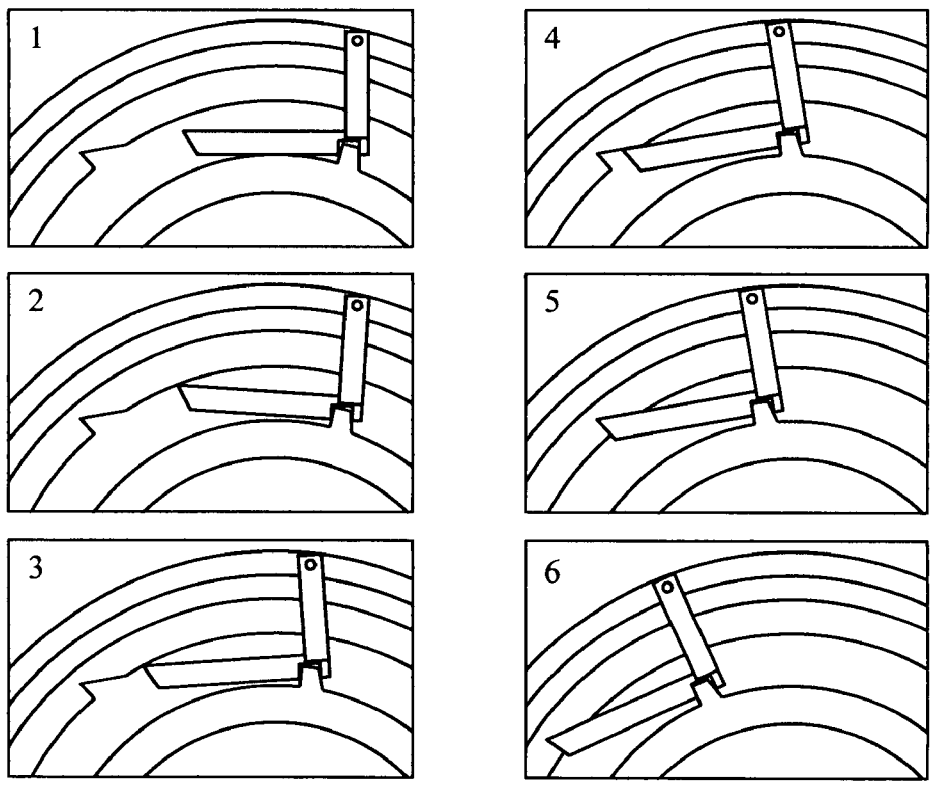
FIG. 2 Sequential instances of the engagement process as viewed through the dashed rectangular segment 2 in FIG. 1.

With reference to FIG. 1, a clockwise rotation of the driving ring imparts the same rotation to the pawl and the pawl ring while the driven ring remains stationary. A counterclockwise rotation of the driving ring causes the pawl to rotate clockwise with respect to the pivot until the pawl arm contacts the inner surface of the driven ring. Further counterclockwise rotation of the driving ring maintains the said contact until the pawl arm is fully engaged with the notch on the driven ring. From this point on, the entire mechanism rotates counterclockwise in unison. Frames 1 to 6 in FIG. 2, as viewed through the dashed rectangular segment 2 in FIG. 1, sequentially depict the engagement process just described.

Figure 30:
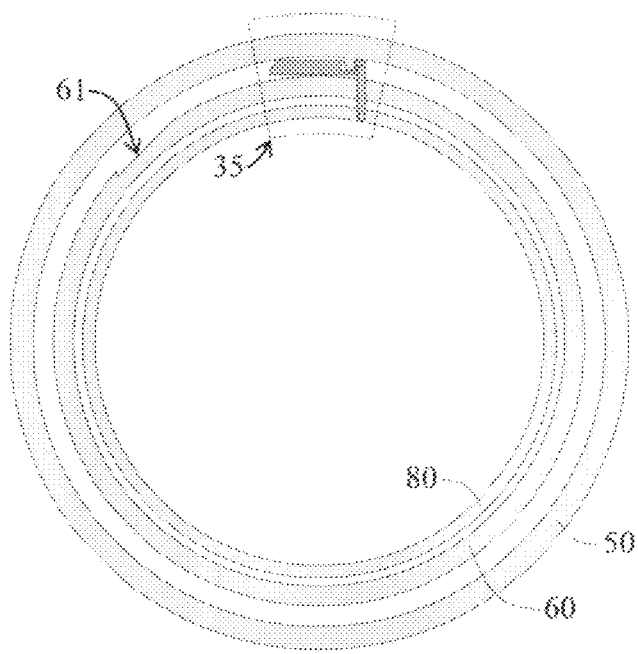
FIG. 30 A schematic axial view of an embodiment of the present invention in the freewheeling mode, including a driving ring with a pair of keys on its inner cylindrical surface, a driven ring with a notch on its outer cylindrical surface, a pawl ring with a pivot hole, and an L-shaped pawl comprising an arm with a slant at one end, and a stem that overlaps the arm at one end and includes a pivot hole at the other end.
Figure 35:
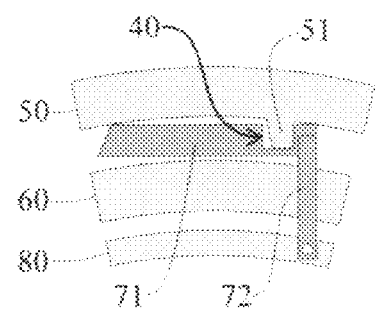
Figure 31:
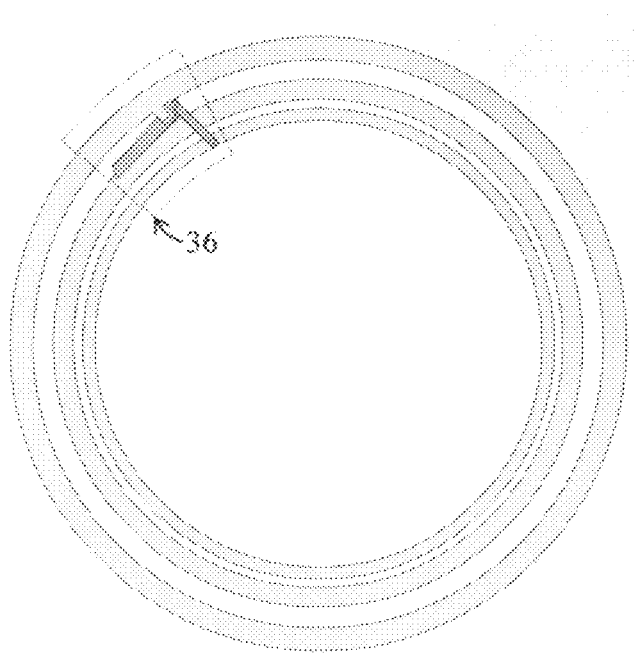
FIG. 31 The embodiment of FIG. 30 in the engaged mode.
Figure 36:
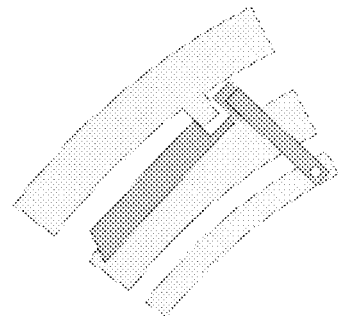

Axial views of another embodiment in the freewheeling and engagement modes are shown respectively in FIGS. 30 and 31 in which the said three rings are stacked radially, the driving ring 50 encircles the driven ring 60, and the driven ring 60 encircles the pawl ring 80; and in which the said operative coupling is achieved by interaction between a pair of keys 51 and 52 on the surface of driving ring 50 facing the driven ring 60 and the corner end of the pawl arm 71 together with the corner end of the pawl stem 72 overlapping the pawl arm 71. In this embodiment, the engaging means on the driven ring 60 is in the form of a notch 61.

With reference to FIG. 30, a clockwise rotation of the driving ring imparts the same rotation to the pawl and the pawl ring while the driven ring remains stationary. A counterclockwise rotation of the driving ring causes the pawl to rotate counterclockwise with respect to the pivot until the pawl arm contacts the outer surface of the driven ring. Further counterclockwise rotation of the driving ring maintains the said contact until the pawl arm is fully engaged with the notch on the driven ring. From this point on, as shown in FIG. 31, the entire mechanism rotates counterclockwise in unison.

Radial views of yet another embodiment in the freewheeling and engagement modes are shown respectively in FIGS. 32 and 33 in which the said three rings are stacked axially such that the driven ring 60 is disposed between the driving ring 50 and the pawl ring 80; and in which the said operative coupling is achieved by interaction between a pair of keys 51 and 52 on the surface of the driving ring 50 facing the driven ring 60 and the corner end of the pawl arm 71 together with the corner end of the pawl stem 72 overlapping the pawl arm 71. In this embodiment, the engaging means on the driven ring 60 is in the form of a notch 61. A radial cross section of the system as viewed through section arrows 34 in FIG. 32 is shown in FIG. 34.

Adopting the right-hand rule, the positive axis of rotation of the said three coaxial rings for this embodiment is indicated by a double-headed arrow in FIGS. 32 and 33.

With reference to FIG. 32, a negative rotation of the driving ring with respect to the double-headed arrow imparts the same rotation to the pawl and the pawl ring while the driven ring remains stationary. A positive rotation of the driving ring with respect to the double-headed arrow causes the pawl to rotate clockwise with respect to the pivot until the pawl arm makes contact with the driven ring. Further positive rotation of the driving ring with respect to the double-headed arrow maintains the said contact until the pawl arm is fully engaged with the notch on the driven ring. From this point on the entire mechanism rotates in unison in the positive direction with respect to the double-headed arrow.

Figure 3:
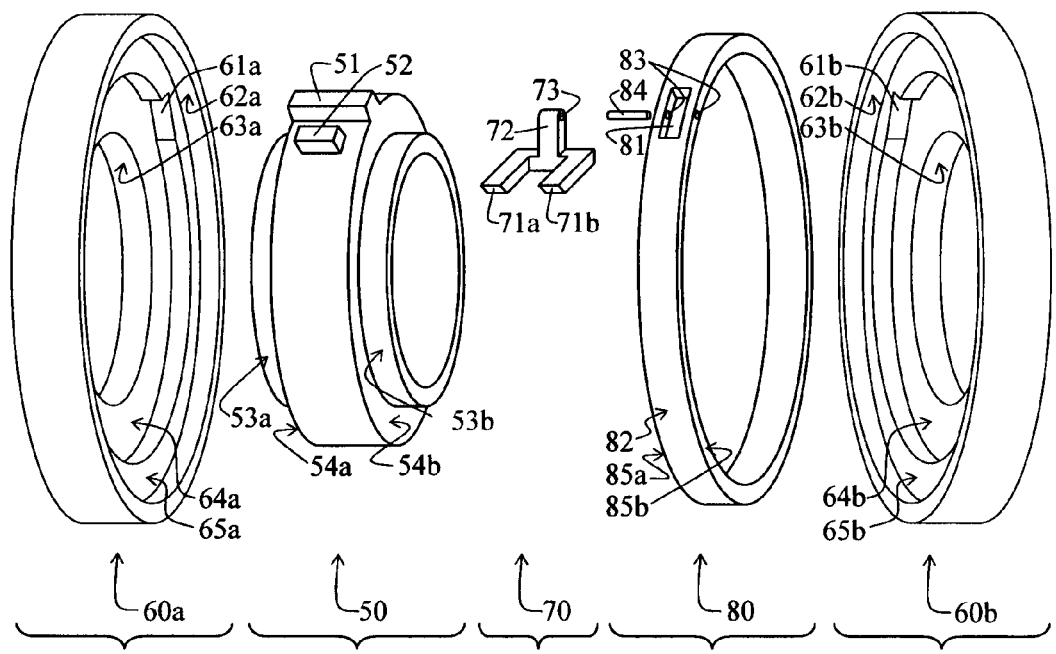
FIG. 3 Exploded view of a simple embodiment of the present invention where the three coaxial rings include additional cylindrical features which enable them to support each other both radially and axially; and, to facilitate the assembly of the three coaxial rings, the driven ring is cut in half axially to produce a driven ring consisting of two halves that are mirror images of each other; and, corresponding to the twin design of the driven ring, the pawl, still having an L-shaped configuration, is composed of two identical parallel arms; and, because of the pawl's symmetric twin-arm design, no grooves in the arms are required, but instead the driving ring includes on its outermost cylindrical surface a pair of keys: one engaging key to sit behind the arms at their connection to the stem, and one disengaging key to sit in between the arms adjacent to the stem.

FIG. 3 shows an exploded view of a more detailed embodiment of the present invention. The driving ring 50 has, at its outermost radial extremity, one pair of keys 51 and 52 which supplement the said operative coupling. The driven ring 60 is composed of two halves 60a and 60b that are mirror images of each other. Each half includes one notch which together form the said engaging means. The notch 61a corresponds to the driven ring half 60a while the notch 61b corresponds to the driven ring half 60b. The pawl 70 includes two identical parallel arms 71a and 71b that are rigidly joined to a stem 72, and that complement the said operative coupling. The pawl stem 72 incorporates at its free end a pivot hole 73. The pawl ring 80 includes a cutout 81 with two coaxial pivot holes 83.

Figure 4:
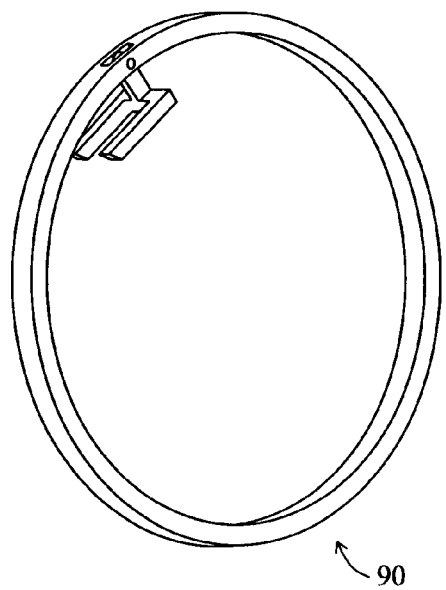
FIG. 4 Isometric view of the pawl assembly consisting of the pawl pivoted to the pawl ring.

FIG. 4 shows the pawl assembly 90 consisting of the pawl 70, the pawl ring 80, and the pin 84. The free end of the pawl stem 72 is inserted in the cutout 81 from the inside of the pawl ring 80 and the pivot holes 73 and 83 are then aligned to admit insertion of the pin 84. The pawl 70 can swing freely about the pin 84 in the central plane of the pawl ring 80.

Figure 5:
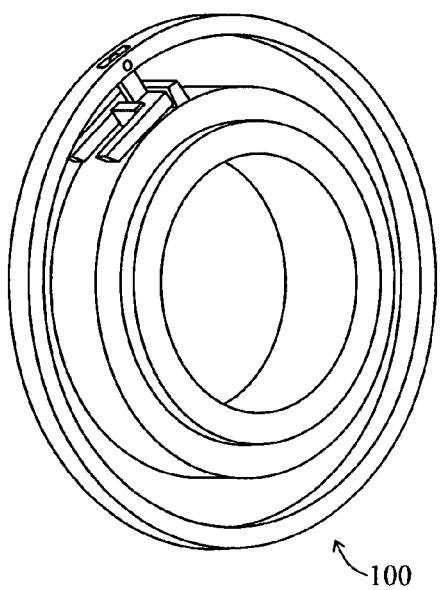
FIG. 5 Isometric view of the driving assembly consisting of the pawl assembly fitted onto the driving ring in such a way that the pawl stem is positioned in the space between the keys on the driving ring.
Figure 6:
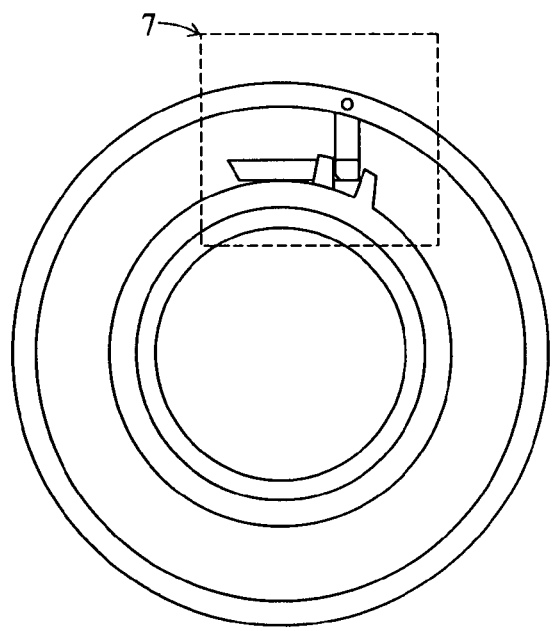
FIG. 6 An axial view of the driving assembly in FIG. 5.
Figure 7:
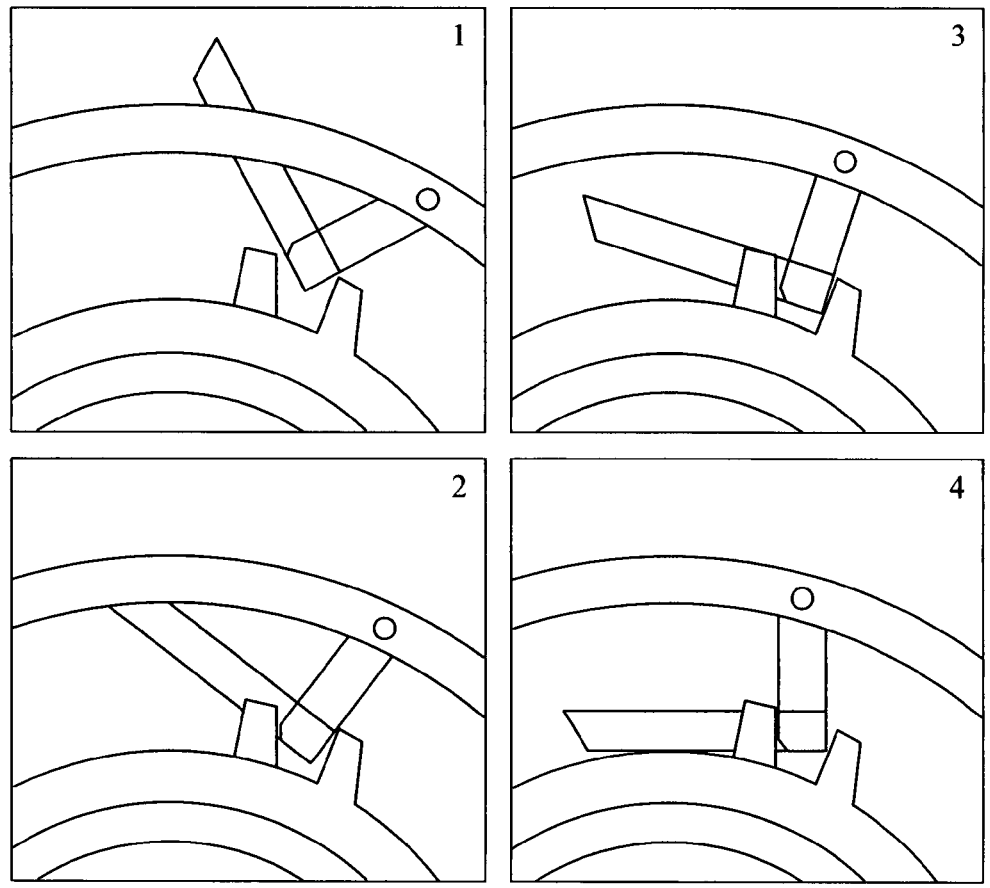
FIG. 7 Sequential instances of the coaxial process of achieving the driving assembly as viewed through the dashed rectangular segment 7 in FIG. 6.

FIG. 5 shows the driving assembly 100 consisting of the pawl assembly 90 and the driving ring 50. The pawl stem 72 is positioned in the space between the keys 51 and 52 while the key 52 is positioned between the pawl arms 71a and 71b. FIG. 6 is an axial view of the driving assembly 100 in which the pawl arm 71b is not shown in order to make the key 52 on the driving ring 50 visible. The placement of the pawl assembly over the driving ring can be achieved in a systematic process during which the pawl ring and the driving ring remain coaxial. FIG. 7 depicts four sequential instances of the driving assembly process as viewed through the dashed rectangular segment 7 in FIG. 6. As illustrated in frame 1 of FIG. 7, the coaxial placement of the pawl assembly 90 over the driving ring 50 would initially require tilting of the pawl toward the free end of the pawl arms in order to prevent the pawl from running into the key 52. As can be noted in FIG. 7, one edge of the pawl stem nearest to the key 52 is chamfered, in this particular case, to accommodate assembly.

Referring to FIG. 3, the driven ring halves 60a and 60b form an axially symmetric enclosure for the driving assembly 100. The two halves connect rigidly through their outermost flange by mechanical fasteners not shown. The cylindrical surfaces 53a and 53b of the driving ring 50 mate with, respectively, the cylindrical surfaces 63a and 63b of the driven ring 60 while the planar surfaces 54a and 54b of the driving ring 50 mate with, respectively, the planar surfaces 64a and 64b of the driven ring 60. Furthermore, the cylindrical surface 82 of the pawl ring 80 mates with the cylindrical surfaces 62a and 62b of the driven ring 60 while the planar surfaces 85a and 85b of the pawl ring 80 contact with, respectively, the planar surfaces 65a and 65b of the driven ring 60. The mating surfaces just identified are lubricated to incur practically negligible friction. It is evident that, in lieu of lubrication, other friction reducing means such as mechanical bearings can also be inserted between the mating surfaces.

Figure 8:
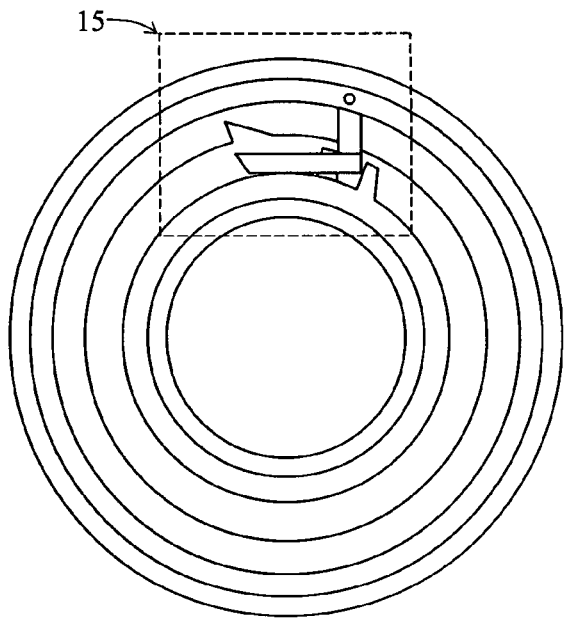
FIG. 8 An axial view of the assembled system in freewheeling mode.
Figure 9:
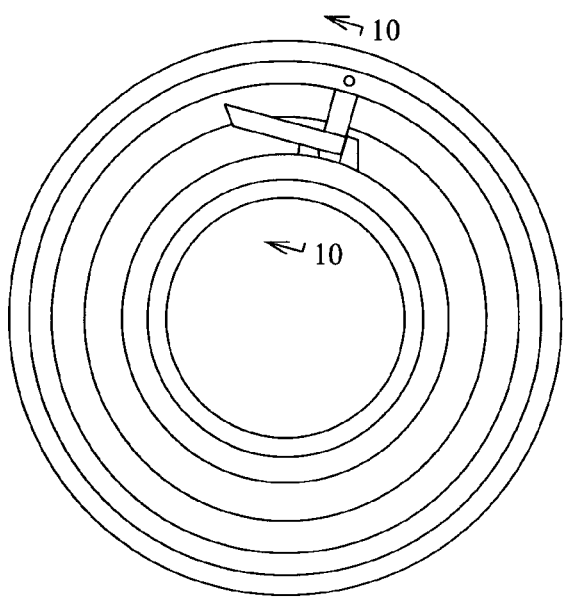
FIG. 9 An axial view of the assembled system in the engaged mode.
Figure 10:
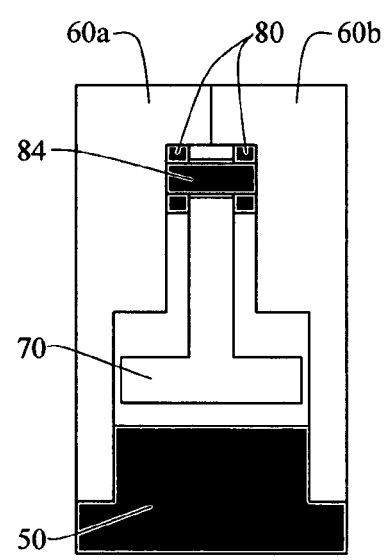
FIG. 10 Radial cross section of the system as viewed through section 10 in FIG. 9.

FIGS. 8 and 9 show axial views of the assembled components without the driven ring half 60b. The configuration in FIG. 8 is termed "freewheeling" in the sense that the driving assembly can rotate freely in a first rotational direction with respect to the driven ring. The configuration in FIG. 9 is termed "engaged" in the sense that the pawl arms are jammed between the driving ring key 51 and the driven ring notch and thus the entire mechanism rotates in unison in a second rotational direction. In order to provide another illustration of the positional relationships among components of the mechanism in the embodiment under consideration, a radial cross section through the pivot hole, as indicated by section arrows 10 in FIG. 9, is shown in FIG. 10 in which the driven ring half 60b is also illustrated.

Figure 12:
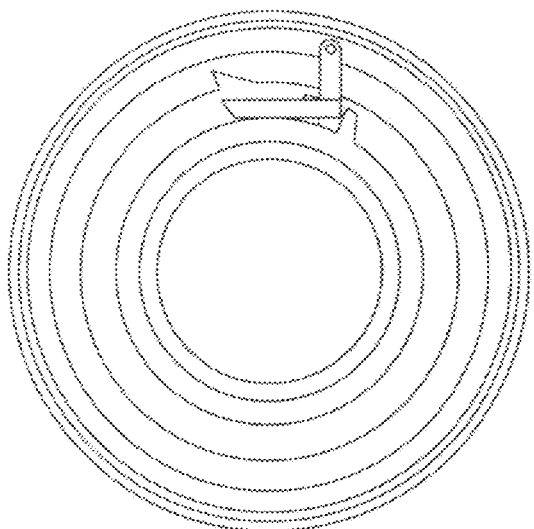
FIG. 12 An axial view of the assembled system in freewheeling mode utilizing a double-stem pawl and a T-shaped pawl ring.
Figure 11:
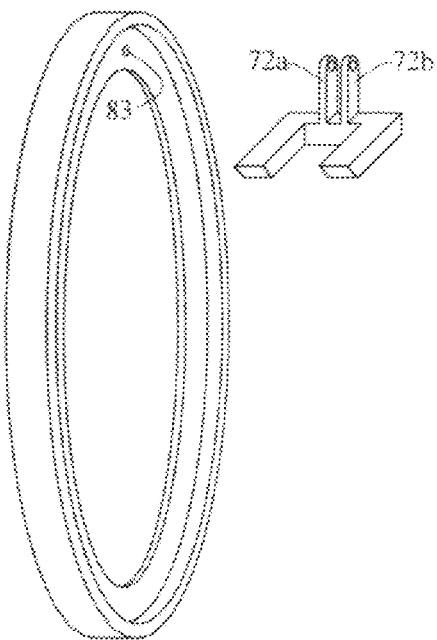
FIG. 11 Isometric views of a double-stem pawl and its corresponding T-shaped pawl ring.
Figure 13:
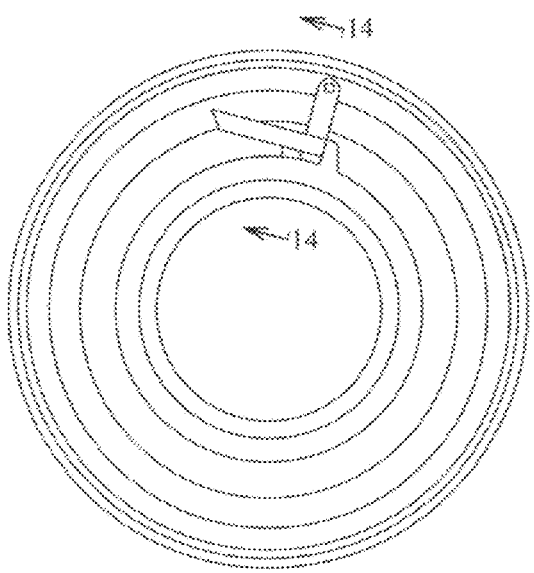
FIG. 13 An axial view of the assembled system in the engaged mode utilizing a double-stem pawl and a T-shaped pawl ring.
Figure 14:
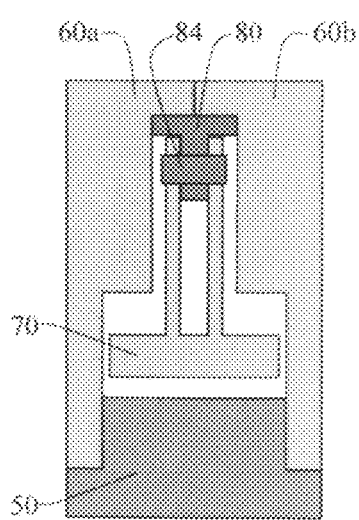
FIG. 14 Radial cross section of the system with a double-stem pawl and a T-shaped pawl ring as viewed through section 14 in FIG. 13.

A slightly different design for the pawl assembly 90 is shown in FIG. 11. In this particular construct, the pawl incorporates two stems 72a and 72b and the pawl ring has a radial cross section in the shape of T, therefore consisting of a flange and a web, with the web pointing radially inward and containing the axial pivot hole 83. Plan and section views of the mechanism with the "double-stem" pawl assembly, are shown in FIGS. 12 to 14 which correspond, respectively, to FIGS. 8 to 10 for the "single-stem" pawl assembly. The radial cross section in FIG. 14 corresponds to section arrows 14 in FIG. 13 and includes the driven ring half 60b.

Figure 15:
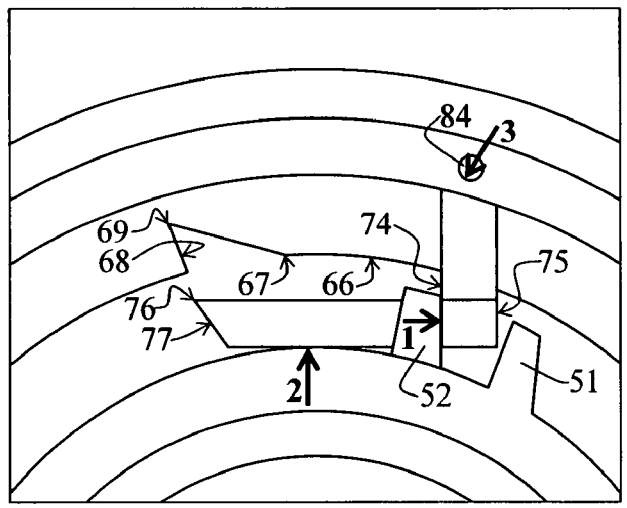
FIG. 15 Enlargement of the dashed rectangular segment 15 in FIG. 8.
Figure 29:
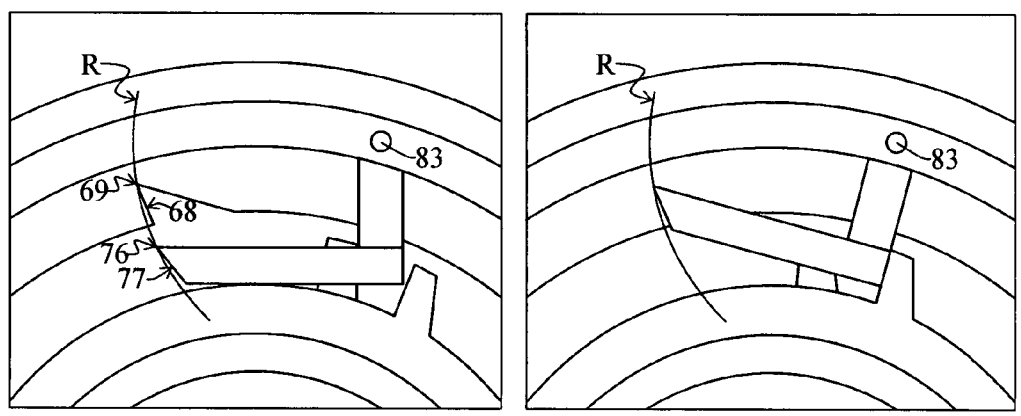
FIG. 29 Illustration of the layout procedure for the profiles of the driven ring notch and the free end of the pawl arms.

The freewheeling and engagement modes of operation are described in the sequel where references to clockwise and counterclockwise rotations are made with respect to the axial view in FIG. 8. FIG. 15 is an enlargement of the dashed rectangular segment 15 of the axial view in FIG. 8. In FIG. 15 the pawl arm 71b is not shown in order to make the key 52 on the driving ring 50 visible. FIG. 29 shows corresponding partial axial views of the mechanism in the freewheeling and engaged configurations and includes design details for the free end of the pawl arm and the corresponding notch on the driven ring. The circular arc R in FIG. 29 is centered at the center of the pivot hole 83 and goes through the top end points 76 and 69 of, respectively, the profiles 77 and 68. The said profiles are slanted equally to just fall on the inside of the arc R.

The operation in the freewheeling mode can be described with reference to FIGS. 8 and 15. When freewheeling, the driving ring 50 rotates clockwise with respect to the driven ring 60. Consequently, the key 52 contacts the front side 74 of the pawl stem 72 and rotates the pawl counterclockwise about the pin 84. The said pawl rotation subsequently brings the pawl arms 71 into line contact with the driving ring 50. The contact force exerted on the pawl 70 by the key 52 is illustrated symbolically by a horizontal arrow 1 in FIG. 15. The contact force exerted on the pawl 70 by the driving ring 50 is also illustrated symbolically by a vertical arrow 2 in FIG. 15. The two forces 1 and 2 cause a reaction force, indicated symbolically by the arrow 3, exerted on the pawl 70 by the pin 84. The combined effect of the three forces just described holds the pawl 70 stationary with respect to both the driving ring 50 and the pawl ring 80. As a result, the driving ring 50, the pawl 70, and the pawl ring 80, which constitute the driving assembly 100, rotate clockwise in unison without transmitting torque to the driven ring 60.

It is evident that, while freewheeling, the mechanism does not require the pawl to be biased toward engaging the notch on the driven ring which constitutes a unique feature of the present invention attributed firstly to the ability of the pawl arm to rotate about a pivot centered outside the line of thrust of the pawl arm and secondly to the said kinematical characteristics of the operative coupling.

Figure 16:
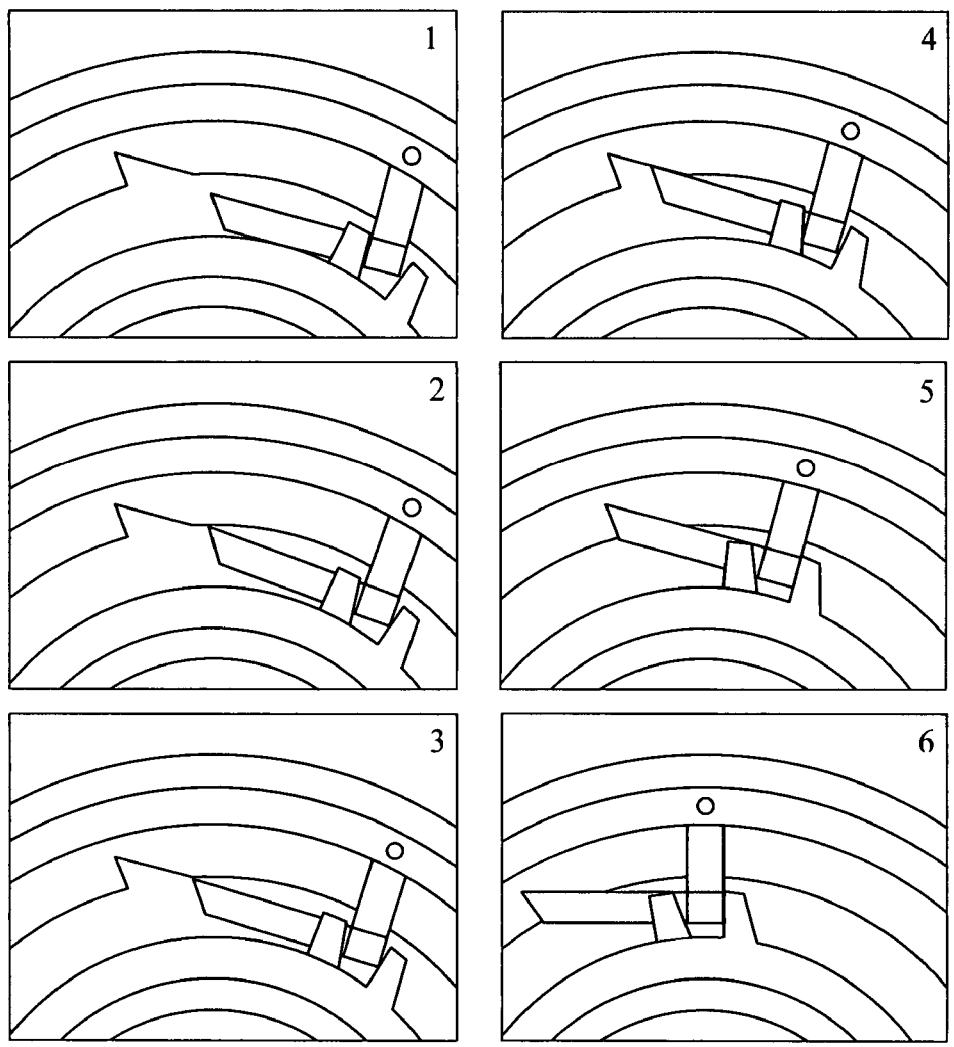
FIG. 16 Sequential instances of the engagement process as viewed through the dashed rectangular segment 15 in FIG. 8.

FIG. 16 illustrates sequential instances of one engagement process as viewed through the dashed rectangular segment 15 in FIG. 8. The operation in the engaging mode can be described with reference to FIGS. 8, 15, and 16. When in the engaging mode, the driving ring 50 rotates counterclockwise with respect to the driven ring 60. Consequently, the key 51 on the driving ring 50 contacts the backside 75 of the pawl 70 and rotates the pawl 70 clockwise about the pin 84. The clockwise rotation of the pawl 70 continues until the edge 76 of the pawl arm 71 touches the surface 66 of the driven ring 60. The operation up to this point is illustrated sequentially in frames 1 and 2 of FIG. 16, in which the pawl ring 80 remains stationary. Further counterclockwise rotation of the driving ring 50 causes the pawl 70 to undergo a counterclockwise rotation about the axis of the clutch system, which occurs in unison with a counterclockwise rotation of the pawl ring 80, until, as depicted in frame 3, the pawl edge 76 reaches the edge 67 of the notch 61. From this point on further counterclockwise rotation of the driving ring 50 causes the pawl 70 to undergo a combination of two rotations. One rotation is counterclockwise about the axis of the clutch system, which occurs in unison with a counterclockwise rotation of the pawl ring 80. The other rotation is clockwise about the center of the pin 84 on the rotating pawl ring 80. The combined rotation of the pawl 70 continues until the pawl arm 71 completely engages with the notch 61. Frames 4 and 5 in FIG. 16 illustrate the combined rotation of the pawl 70 until engagement. Starting from the configuration in frame 5, the system operates in an engaged mode where, as shown in frame 6, the entire system rotates counterclockwise.

Figure 17:
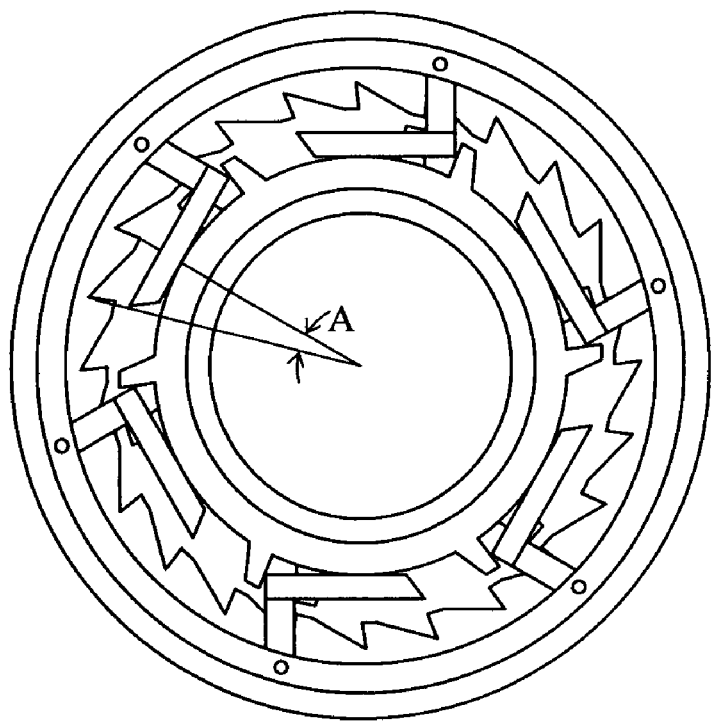
FIG. 17 An axial view of an embodiment of the present invention in freewheeling mode that includes a plurality of uniformly spaced pawls; and in which, the driving ring includes a plurality of uniformly spaced key pairs that are equal in number to the number of pawls while the driven ring includes a plurality of uniformly spaced notches that are equal in number to a whole multiple of the number of pawls.
Figure 18:
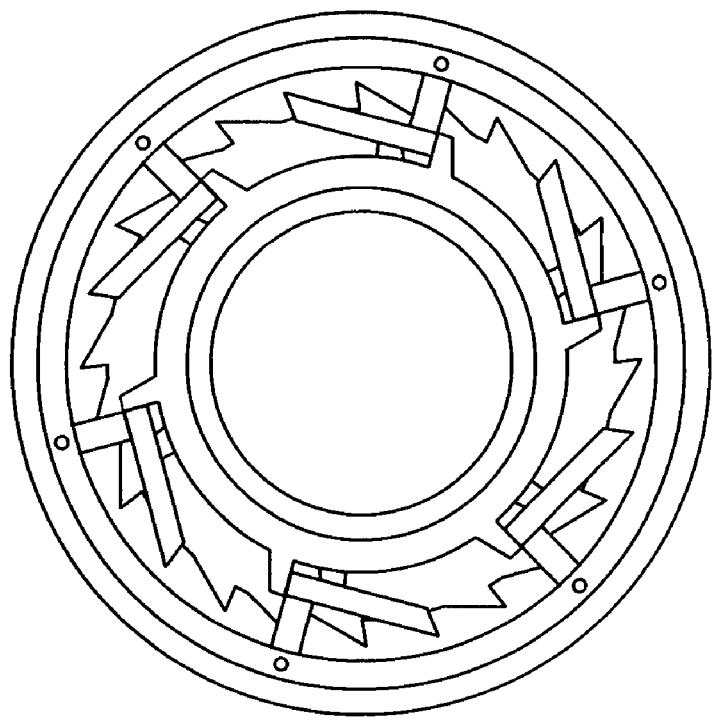
FIG. 18 Embodiment of FIG. 17 in the engaged mode.

An axial view of a more mechanically efficient embodiment of the present invention in freewheeling configuration is shown in FIG. 17 in which the driven ring half 60*b* is left out for transparency. FIG. 18 illustrates the engaged configuration. The embodiment as depicted in FIGS. 17 and 18 utilizes a plurality of uniformly spaced pawls that are pivoted to the pawl ring in the same manner as described for a single pawl. Correspondingly, the driving ring includes a plurality of uniformly spaced key pairs 51 and 52 that are equal in number to the number of pawls; and the driven ring includes a plurality of uniformly spaced notches 61 whose quantity equals a whole multiple of the number of pawls. The assembly, freewheeling, and engagement processes as described previously apply equally to the embodiment in FIGS. 17 and 18.

The engagement process involves a certain degree of backlash, that is, it involves a finite rotation of the driving assembly 100 with respect to the driven ring 60 prior to engagement. The degree of backlash depends on the relative rotational positions of the driving assembly 100 and the driven ring 60 at the inception of the engagement mode. The maximum degree of backlash is the sectoral extent A between two successive notches as illustrated in FIG. 17. Since reduction in backlash is desirable in certain applications, three distinct methods of backlash reduction are presented in the following paragraphs. The three methods of backlash reduction can also be used in combination.

The most obvious method of backlash reduction is to increase the number of notches 61 on the driven ring 60.

Figure 19:
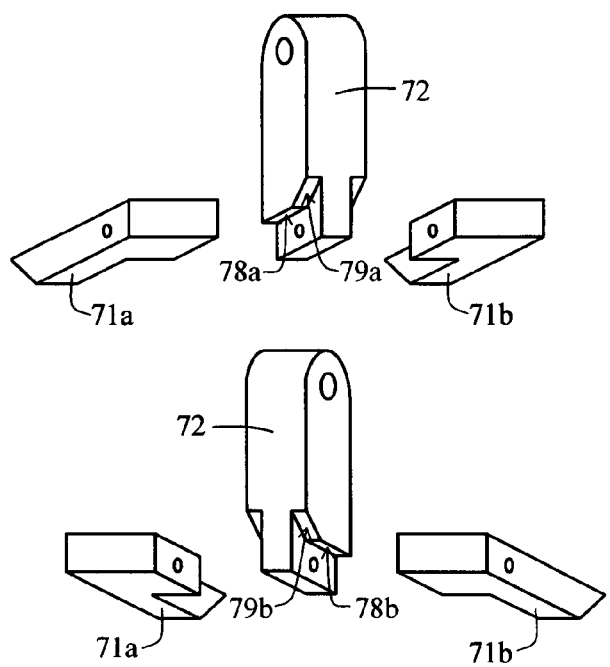
FIG. 19 One variation of a compliant pawl that utilizes a pin and a rotational spring at the juncture of the stem with the arms.
Figure 20:
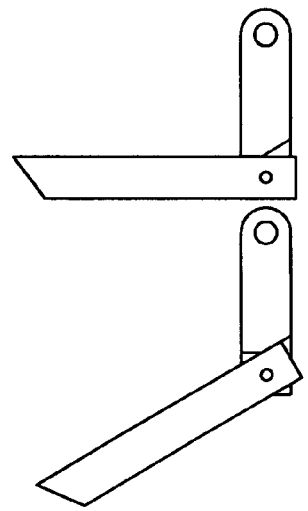
FIG. 20 Plan views of the assembled compliant pawl in FIG. 19 in two limiting rotational configurations.
Figure 21:
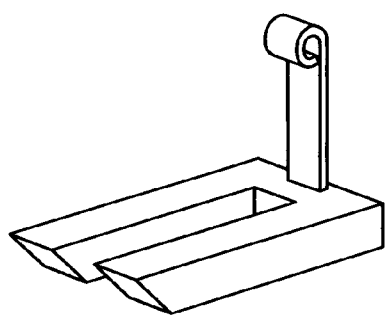
FIG. 21 Another variation of a compliant pawl that utilizes a compliant stem fabricated from sheet spring material.
Figure 22:
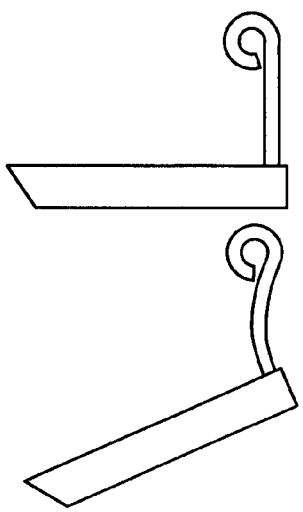
FIG. 22 Plan views of the compliant pawl in FIG. 21 showing the unloaded state and an instant of the deformed state.

Another method of backlash reduction is to employ a compliant variation of the rigid pawl 70. For clarity of presentation, two views of one of various constructs of a compliant pawl 70 are shown in FIG. 19. In this particular construct, the pawl arms 71*a* and 71*b* connect to the pawl stem 72 by a pin and a rotational spring not shown. The pin holes on the arms and the stem, once axially aligned accommodate the said connectivity. The pawl stem 72 includes two cutouts that are mirror images of each other. The surfaces 78*a* and 79*a* of the first cutout provide limits of rotation between the pawl stem 72 and the pawl arm 71*a* while the surfaces 78*b* and 79*b* of the second cutout provide the same limits of rotation between the pawl stem 72 and the pawl arm 71*b*. Plan views of the assembled compliant pawl in two limiting rotational configurations are shown in FIG. 20. The top view in FIG. 20 shows the compliant pawl 70 in its unloaded state where, by virtue of an initial torque in the said rotational spring, the pawl arms 71*a* and 71*b* are snugly fitted against, respectively, the surface 78*a* and 78*b*. The bottom view in FIG. 20 shows the compliant pawl 70 in its fully deformed state where the pawl arms 71*a* and 71*b* come in contact with, respectively, the surfaces 79*a* and 79*b* on the pawl stem. Another variation of a compliant pawl is shown in FIG. 21 in which the pawl, instead of a rotationally compliant joint at the corner, utilizes a compliant stem fabricated from sheet spring material. The compliant stem is rigidly joined to the arms at one end and includes a circular feature at the opposite end to accommodate pivoting of the pawl to the pawl ring. Plan views of the compliant pawl in FIG. 21 are shown in FIG. 22 in which the top view shows the unloaded state whereas the bottom view shows an instant of the deformed state.

Figure 23:
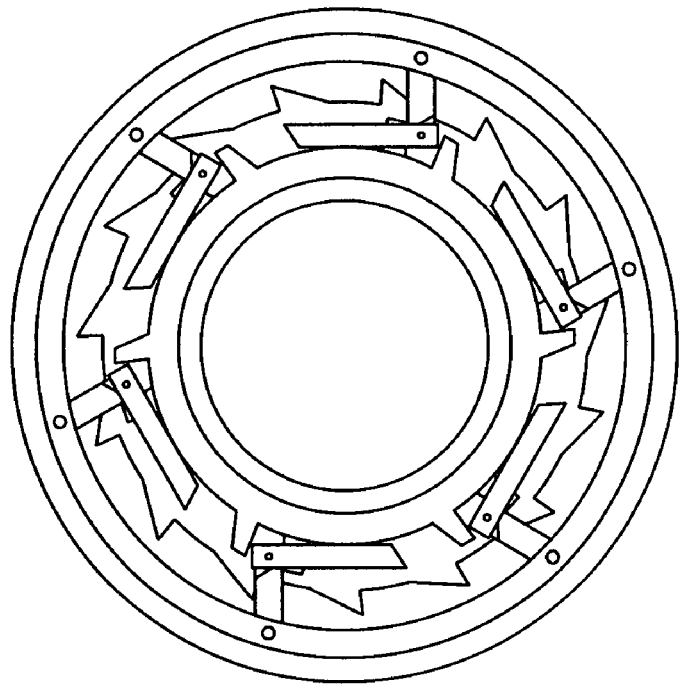
FIG. 23 An axial view of an embodiment of the present invention in freewheeling mode that utilizes compliant pawls of the type in FIG. 19.
Figure 24:
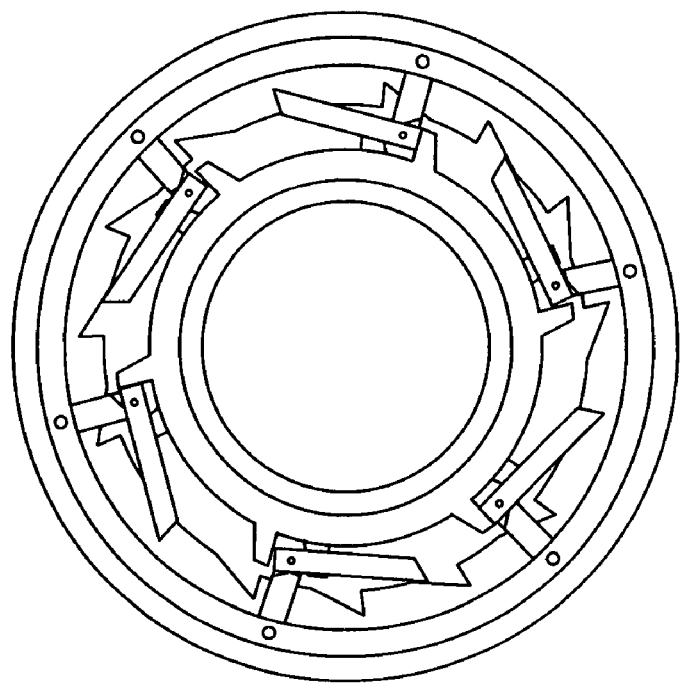
FIG. 24 An axial view of the embodiment in FIG. 23 in the engaged mode.

An axial view of an embodiment of the present invention with compliant pawls of the type in FIG. 19 is shown in FIG. 23 where the driven ring half 60*b* is omitted for clarity of presentation. The embodiment in FIG. 23 utilizes a plurality of pawls, not equal to a prime number, that are uniformly pivoted to the pawl ring. Correspondingly, the driving ring includes a plurality of uniformly spaced key pairs 51 and 52 that are equal in number to the number of pawls. The driven ring includes a plurality of uniformly spaced notches 61 whose quantity does not equal a whole multiple of the number of pawls; but does equal a whole multiple of a whole fraction of the number of pawls. In the particular arrangement in FIG. 23, the number of notches (15) does not equal a whole multiple of the number of pawls (6); but does equal a whole multiple (5) of a whole fraction (3) of the number of pawls (6). Consequently, as shown in FIG. 24, only a fraction (3:6=½) of the number of pawls undergo engagement; the rest deform to avoid binding with the driven ring. Upon activation of the freewheeling mode, the engaged pawls rotate back, and the deformed pawls rotate and retract back to their respective freewheeling configuration in FIG. 23. The embodiment in FIG. 23 can be said to include M (an integer greater than 1) sets of N (and integer greater than 0) pawls of which only one set participates in engagement in any given engagement mode of operation. It is also evident that utilization of the compliant pawls of the type in FIG. 21 produces the same result as described in this paragraph.

Figure 25:
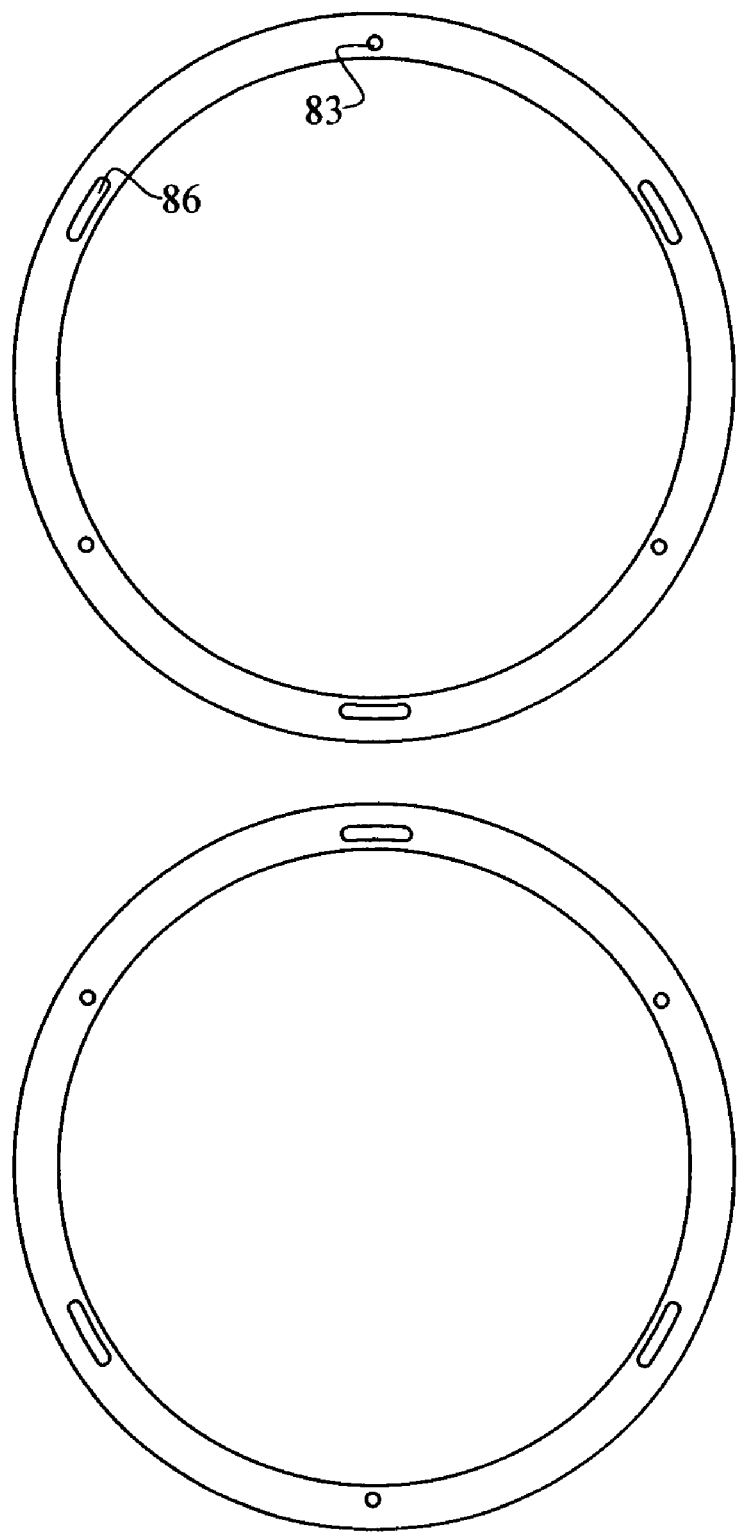
FIG. 25 Features and relative orientations of the pawl rings as used in the multi-ring embodiment of FIG. 26.

Yet another method of backlash reduction is to employ M pawl assemblies, where each pawl assembly consists of a pawl ring and a set of N uniformly spaced pawls. For this purpose, a rigid double-stem pawl and its corresponding pawl ring, as shown in FIG. 11, are used. FIG. 25 shows M=2 identical pawl rings with a plurality N=3 of round pivot holes 83 that are uniformly distributed in a circular pattern with the subtended angle of each pair of consecutive pivot holes equal to $2\pi/N=2\pi/3$. Each pawl ring also includes a plurality N(M−1)=3 of sectoral slots 86 that are situated at the same radius as that of the round pivot holes 83, and that divide into equal parts, $2\pi/MN=\pi/3$, the angle subtended by each two consecutive round pivot holes 83. Starting from the top pawl ring 80 in FIG. 25 and proceeding sequentially downward, the next pawl ring 80 in shown rotated counterclockwise by $2\pi/MN=\pi/3$ with respect to the previous pawl ring 80.

When the N=2 pawl rings 80 in FIG. 25 are overlaid, each round pivot hole 83 in a given pawl ring 80 aligns with M−1=1 sectoral slots 86 in the remaining pawl rings. It is to this overlaid arrangement of the pawl rings 80 that the MN=6 pawls 70 are pivoted. Consequently, an individual pawl assembly can rotate with respect to the remaining M−1=1 pawl assemblies up to a limit imposed by the sectoral slots 86.

Figure 26:
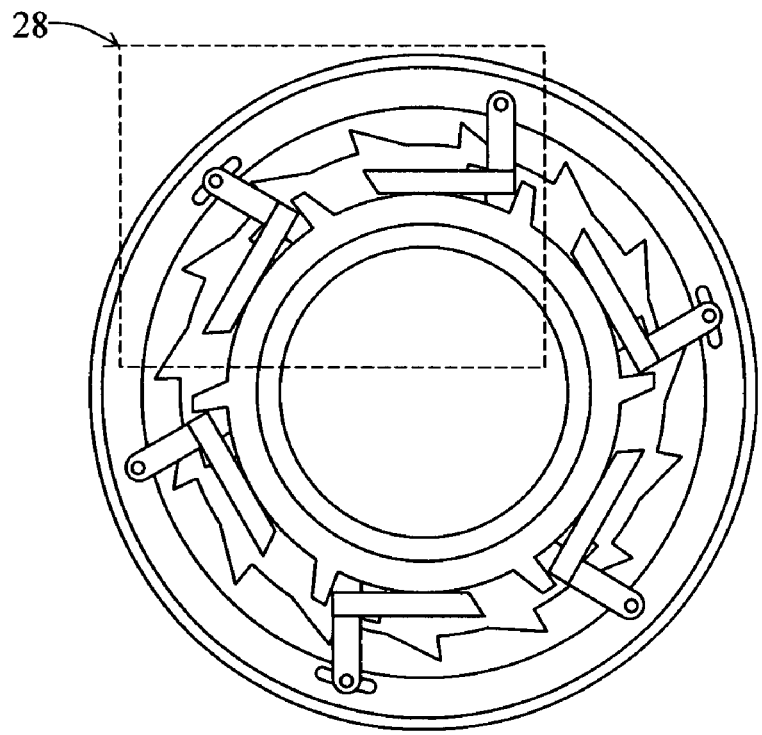
FIG. 26 An axial view of the multi-ring embodiment of the present invention in the freewheeling mode.
Figure 27:
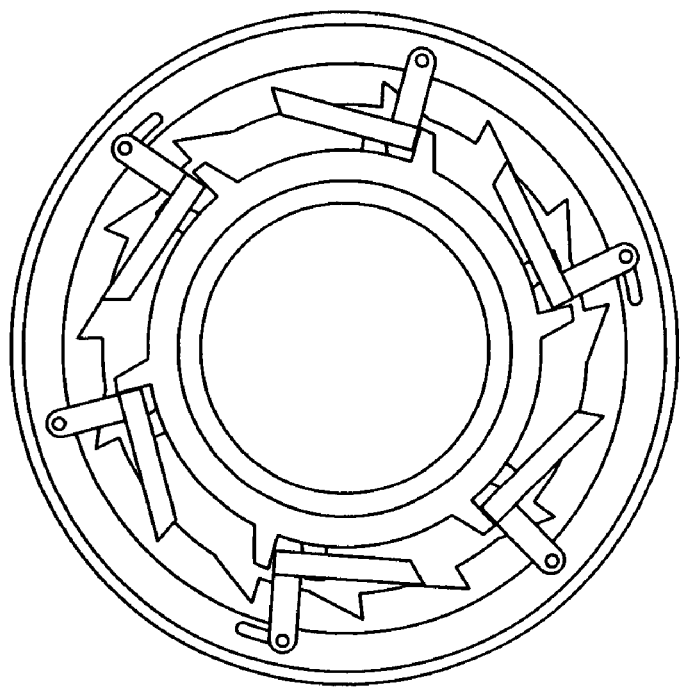
FIG. 27 An axial view of the embodiment in FIG. 26 in the engaged mode.
Figure 28:
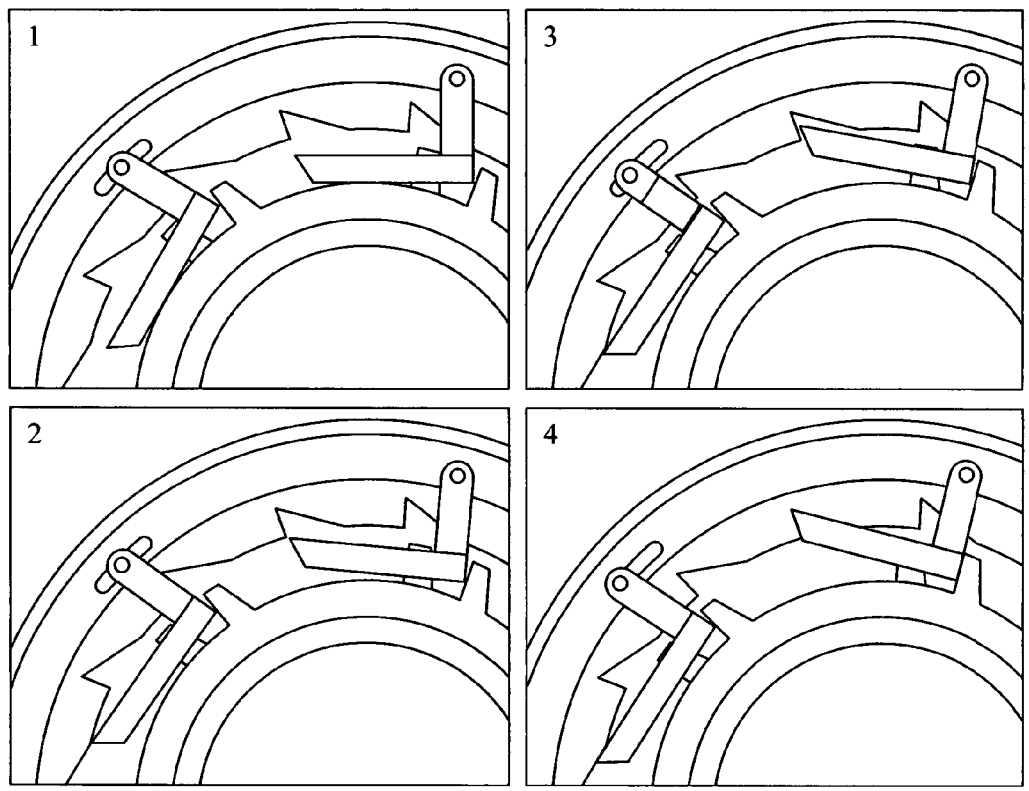
FIG. 28 Sequential instances of an engagement process for the multi-ring embodiment in FIG. 26, as viewed through the dashed rectangular segment 28 in FIG. 26.

An axial view of the multi-ring embodiment of the invention without the driven ring half 60b is shown in FIG. 26. In the configuration of FIG. 26 the number of notches is chosen according to the same procedure used for the compliant pawl embodiment with the result that the pawls in the same pawl assembly have the same positional alignment with the notches, whereas any two pawls belonging to different pawl assemblies have different positional alignment with the notches. The said alignment differences together with the ability of the pawl rings to have a finite rotational freedom with respect to each other facilitate an engagement mode of operation with reduced backlash. Upon engagement, the plan view in FIG. 26 assumes the configuration in FIG. 27. FIG. 28 illustrates sequential instances of one engagement process as viewed through the dashed rectangular segment 28 in FIG. 26. As evident from FIG. 28 only the pawls on one pawl ring undergo engagement; the rest slide to avoid binding with the driven ring. Upon activation of the freewheeling mode, the engaged pawls rotate back, and the non-engaged pawls rotate and slide back to their respective freewheeling configuration in FIG. 26.

What is claimed is:

1. A one-way clutch mechanism comprising a driving ring, a driven ring, and a pawl ring, wherein the said three rings are coaxial and the driven ring is disposed between the driving ring and the pawl ring;

and furthermore, the mechanism comprises a generally L-shaped pawl comprising an arm, a corner, and a stem, where the free end of the pawl stem is pivoted to the pawl ring in such a way that the pawl arm is disposed between the driving ring and the driven ring;

and furthermore, the driven ring, on one surface facing the driving ring, comprises an engaging means for receiving the free end of the pawl arm;

and furthermore, the driving ring and the pawl arm are operatively coupled so as to facilitate two distinct modes of operation; namely, the freewheeling mode and the engagement mode;

where, in the freewheeling mode, the said coupling acts in such a way that rotation of the driving ring in a first rotational direction causes the free end of the pawl arm to move toward the driving ring until the pawl arm contacts the driving ring, at which point the driving ring, the pawl, and the pawl ring rotate in unison in the same direction without affecting the driven ring;

and where, in the engagement mode, the said coupling acts in such a way that rotation of the driving ring in a second rotational direction causes the free end of the pawl arm to move away from the driving ring until the pawl arm contacts the driven ring, at which point additional rotation of the driving ring in the same direction maintains the said contact until the pawl arm is fully engaged with the engaging means on the driven ring, from which point the entire mechanism rotates in unison in the same direction;

and evidently, while in freewheeling mode, the pawl is not biased toward maintaining contact with the driven ring and hence does not ratchet against the driven ring.

2. The mechanism recited in claim 1 in which the said three rings are stacked radially, the pawl ring encircles the driven ring, and the driven ring encircles the driving ring.

3. The mechanism recited in claim 1 in which the said three rings are stacked radially, the driving ring encircles the driven ring, and the driven ring encircles the pawl ring.

4. The mechanism recited in claim 1 in which the said three rings are stacked axially such that the driven ring is disposed between the driving ring and the pawl ring.

5. The mechanism recited in claim 2 where the three coaxial rings are augmented to support each other radially and axially without altering their intended functions, and the pawl is augmented to contain an axial plane of symmetry without altering its essential geometrical and operational features;

and accordingly, the radial cross section of the driving ring assumes the shape of T, consisting therefore of a flange and a web, with the web pointing radially outward, while the radial cross section of the driven ring assumes a shape such that when the driven ring is assembled onto the driving ring, their combined radial cross section is rectangular having a hollow core in the shape of T, consisting therefore of a flange and a web, with the web pointing radially outward;

and furthermore, the radial cross section of the pawl ring is disposed at the free end of the web of the said T-shaped hollow core;

and to facilitate the assembly of the three coaxial rings, the driven ring is cut in half axially to produce a driven ring consisting of two halves that are mirror images of each other and that each half has a radial cross section in the shape of a stair with three steps, where the radially disposed edge of the third step signifies the line of symmetry of the two driven ring halves, the axially disposed edge of the third step supports the pawl ring radially, the radially disposed edge of the second step supports the pawl ring axially, the radially disposed edge of the first step supports the driving ring axially, the axially disposed edge of the first step supports the driving ring radially, and the axially disposed edge in the second step of each driven ring half is associated with the cylindrical surface of the driven ring containing the engaging means in the form of a notch, such that the two notches face each other and thus the two driven ring halves remain mirror images of each other;

and corresponding to the twin design of the driven ring, the pawl, still having an L-shaped configuration, is composed of two identical parallel arms in the shape of U that are connected at their juncture to the corner end of the stem;

and furthermore, the pawl's arms are disposed within the flange of the said T-shaped hollow core;

so that, one arm faces the notched cylindrical surface of the first driven ring half and the other arm faces the notched cylindrical surface of the second driven ring half;

and so that, the free end of the stem extends into the web of the said T-shaped hollow core to be pivoted to the pawl ring;

and to achieve the said operative coupling, the driving ring includes on its outermost cylindrical surface a pair of keys: one engaging key to sit behind the arms at their connection to the stem, and one disengaging key to sit in between the arms adjacent to the stem;

And evidently, in assembled configuration the three rings support each other both radially and axially while possessing a symmetric radial cross section and the pawl has a symmetric projection as viewed in any direction orthogonal to the axis of the assembled mechanism.

6. The mechanism recited in claim 2, 3, or 4 in which the said operative coupling is achieved by interaction between a key on the driving ring surface facing the driven ring and a groove in the corner end of the pawl arm in which the said key is disposed.

7. The mechanism recited in claim 2, 3, or 4 in which the engaging means on the driven ring is in the form of a notch.

8. The mechanism recited in claim 5 wherein the pawl ring incorporates a radial cutout midway through the pivot hole in the pawl ring in order to house the free end of the pawl's stem for pivoting.

9. The mechanism recited in claim 5 wherein the pawl ring has a T cross section, consisting therefore of a flange and a web, with the web pointing radially inward and containing the axial pivot hole;

and where the pawl employs two identical parallel stems so that the web of the T-shaped pawl ring is inserted between the stems for pivoting.

10. The mechanism recited in claim 8 or 9, wherein the driven ring halves include an equal number of a plurality of notches that are uniformly distributed in a circular pattern, in such a way that the two driven ring halves remain mirror images of each other.

11. The mechanism recited in claim 10 wherein a plurality of pawls are pivoted uniformly to the pawl ring, the driving ring includes a plurality of key pairs that are uniformly spaced and are equal in number to the number of pawls, and the number of notches on each driven ring half is a whole multiple of the number of pawls.

12. The mechanism recited in claim 11 wherein, in order to minimize backlash upon activation of the engaging mode, the driven ring includes a maximum possible number of uniformly spaced notches.

13. The mechanism recited in claim 12 wherein to minimize the backlash further, M (an integer greater than 1) set of N (an integer greater than 0) compliant variation of the rigid pawl are employed;

and where, the pawl ring includes a plurality of MN pivot holes that are uniformly distributed in a circular pattern;

and where, not only the N pawls belonging to each set are uniformly distributed around the pawl ring but also the total number of pawls MN are uniformly distributed around the pawl ring;

and correspondingly, the number of uniformly spaced key pairs on the driving ring is equal to the total number of pawls MN;

and furthermore, the number of notches on the driven ring halves is chosen such that the pawls in the same set have the same positional alignment with the notches, whereas any two pawls belonging to different sets have different positional alignment with the notches;

and consequently, the said alignment differences together with the ability of the pawls to deform facilitate an engagement mode of operation where only the pawls belonging to one set undergo engagement, the rest deform to avoid binding with the driven ring;

and furthermore, upon activation of the freewheeling mode, the engaged pawls rotate back, and the non-engaged pawls rotate and retract back to their respective freewheeling configuration.

14. The mechanism recited in claim 12 wherein to minimize the backlash further, M (an integer greater than 1) pawl assemblies are employed, where each pawl assembly consists of a pawl ring and a set of N (an integer greater than 0) uniformly spaced pawls;

and furthermore, each pawl ring includes N round pivot holes that are uniformly distributed in a circular pattern with the subtended angle of each pair of consecutive pivot holes equal to $2\pi/N$;

and furthermore, each pawl ring also includes a plurality N(M−1) of sectoral slots that are situated at the same radius as that of the round pivot holes, and that divide into equal parts, $2\pi/MN$, the angle subtended by each two consecutive round pivot holes;

and furthermore, when the M pawl rings are overlaid, each round pivot hole in a given pawl ring aligns with M−1 sectoral slots in the remaining pawl rings;

and furthermore, it is to the said overlaid arrangement of the pawl rings that the MN pawls are pivoted, so that an individual pawl assembly can rotate with respect to the remaining M−1 pawl assemblies up to a limit imposed by the sectoral slots;

and furthermore, the number of notches on the driven ring halves is chosen such that the pawls in the same pawl assembly have the same positional alignment with the notches, whereas any two pawls belonging to different pawl assemblies have different positional alignment with the notches;

and consequently, the said alignment differences together with the ability of the pawl rings to have a finite rotational freedom with respect to each other facilitate an engagement mode of operation where only the pawls on one pawl ring undergo engagement, the rest slide to avoid binding with the driven ring;

and furthermore, upon activation of the freewheeling mode, the engaged pawls rotate back, and the non-engaged pawls rotate and slide back to their respective freewheeling configuration.

15. The mechanism recited in claim 13 in which the compliant pawl is constructed such that the pawl arms are connected to the pawl stem by a pin and a rotational spring;

and where, the pawl stem includes two identical cutouts facing the arms so as to provide limits of rotation between the pawl stem and the pawl arms;

and where, by virtue of an initial torque in the said rotational spring, the pawl arms are snugly fitted to the stem within the said cutouts such that in the said snugly fitted configuration the arms cannot rotate toward the stem, but can rotate away from the stem up to the limit imposed by the said cutouts on the stem.

16. The mechanism recited in claim 13 in which the compliant pawl utilizes a stem fabricated from sheet spring material;

and where, the compliant stem is rigidly joined to the arms at one end and includes a formed circular feature at the opposite end to accommodate pivoting of the pawl to the pawl ring.

* * * * *